United States Patent
Faith et al.

(10) Patent No.: US 8,918,378 B1
(45) Date of Patent: Dec. 23, 2014

(54) CLONING USING AN EXTENT-BASED ARCHITECTURE

(75) Inventors: Rickard E. Faith, Hillsborough, NC (US); Subramaniam Periyagaram, Santa Clara, CA (US); Sandeep Yadav, Santa Clara, CA (US); Ashish Prakash, Cary, NC (US); Blake Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 119 days.

(21) Appl. No.: 13/223,226

(22) Filed: Aug. 31, 2011

(51) Int. Cl.
*G06F 7/00* (2006.01)
*G06F 17/00* (2006.01)

(52) U.S. Cl.
USPC ............................................. 707/695

(58) Field of Classification Search
USPC .................. 707/610, 695, 626, 694
See application file for complete search history.

(56) References Cited

U.S. PATENT DOCUMENTS

2006/0179083 A1* 8/2006 Kulkarni et al. ............... 707/204
2011/0055621 A1* 3/2011 Mandagere et al. ............... 714/4

\* cited by examiner

*Primary Examiner* — Usmaan Saeed
*Assistant Examiner* — Paul Kim
(74) *Attorney, Agent, or Firm* — Klein, O'Neill & Singh, LLP

(57) ABSTRACT

An extent-based storage architecture is implemented by a storage server. The storage server generates a new extent identifier for cloning a source extent identified by a source extent identifier and stored at a source data structure that includes a length value providing a length of the source extent, an offset value and a reference count value that provides a number of data containers that reference the source extent identifier. The storage server updates a data structure for a cloned version of the data container for storing the new extent identifier that points to the source extent identifier and includes an extent length value and offset value different from length value and the offset value of the source data structure.

16 Claims, 11 Drawing Sheets

Volume layer indirect entry
700

| FBN 705 | Extent ID 710 | Length 715 |

FIG. 7

Extent map entry
800

| Extent ID 805 | Pointer 810 | Offset 815 | Length 820 | Reference Count 825 | Compression Value 830 |

FIG. 8

Volume layer indirect entry
700

| FBN 705 | Extent ID 710 | Length 715 |

Extent map entry
800

| Extent ID 805 | Pointer 810 | Offset 815 | Length 820 | Reference Count 825 | Compression Value 830 |

Physical Volume
525

| PVBN 905 | PVBN 910 | PVBN 915 | PVBN 920 | PVBN 925 | PVBN 930 | PVBN 935 | PVBN 940 |

FIG. 9

| Extent ID 805 | Pointer 810 | Offset 815 | Length 820 | Reference Count 825 | Compression Value 830 |
|---|---|---|---|---|---|
| E1 | P1 | 0 | 24 |  | 24 |

1100

| Extent ID 805 | Pointer 810 | Offset 815 | Length 820 | Reference Count 825 | Compression Value 830 |
|---|---|---|---|---|---|
| E1 | P1 | 0 | 24 | 1 | 12 |

1105

| Extent ID 805 | Pointer 810 | Offset 815 | Length 820 | Reference Count 825 | Compression Value 830 |
|---|---|---|---|---|---|
| E1 | P1 | 0 | 24 | 2 | 12 |

1110

| Extent ID 805 | Pointer 810 | Offset 815 | Length 820 | Reference Count 825 | Compression Value 830 |
|---|---|---|---|---|---|
| E2 | E1 | 10 | 14 | 1 | 14 |

CLONING USING AN EXTENT-BASED ARCHITECTURE

CROSS-REFERENCE TO RELATED APPLICATIONS

This patent application is related to U.S. patent application filed on Apr. 29, 2011, Ser. No. 13/098,310, entitled "Extent Based Architecture", the disclosure of which is incorporated herein by its entirety.

TECHNICAL FIELD

The present disclosure relates to storage systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2011, NetApp, Inc., All Rights Reserved.

BACKGROUND

Various forms of network-based storage systems exist today. These forms include network attached storage (NAS), storage area networks (SAN's), and others. Network-based storage systems are commonly used for a variety purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). The data is stored and retrieved as storage objects, such as blocks and/or files. A block is a sequence of bytes or bits of data having a predetermined length. A data container (for example, a file) is a collection of related bytes or bits having an arbitrary length. In the context of NAS, a storage server operates on behalf of one or more clients to store and manage file-level access to data. The files may be stored in a storage system that includes one or more arrays of mass storage devices, such as magnetic or optical disks or tapes, by using a data storage scheme such as Redundant Array of Inexpensive Disks (RAID). In a SAN context, a storage server provides clients with block-level access to stored data, rather than file-level access.

Conventional systems typically use a multi-tiered, tree-like structure that includes a virtual volume block number (VVBN) space and a physical volume block number (PVBN) space managing information at storage devices and processing input/output requests. The block size used by the storage system and by other entities (for example, virtual machines) may be different. This may result in misalignment and hence may complicate operations involving cloning and use of compression in storing data containers.

One option for handling the misalignment is to use an extent based architecture where an extent is a contiguous blocks used for storing a data container (for example, a file, directory and others) and is identified by an extent identifier. Continuous efforts are being made to use an extent based solution for efficiently perform cloning operations without having to use conventional VVBNs.

SUMMARY

In one embodiment, a machine implemented method using an extent based architecture for a storage server is provided. In response to a cloning request to clone a portion of a source extent, the storage server generates a new extent identifier that is stored at a source data structure. The source extent includes a group of contiguous blocks for storing a data container. The source data structure includes a length value providing a length of the source extent, an offset value that refers to a distance in blocks from a known location of the data container and a reference count value that provides a number of data containers that reference the source extent identifier.

The storage server updates a data structure for a cloned version of the data container for storing the new extent identifier that points to the source extent identifier. The updated data structure also includes an extent length value that is different from the length value of the source data structure and an offset value that is different from the offset value of the source data structure.

In another embodiment, a machine implemented method is provided. The method includes generating, by a storage server new extent identifier for cloning a portion of a source extent identified by a source extent identifier stored at a source data structure. The source extent includes a group of contiguous blocks for storing a data container and the source data structure includes a length value providing a length of the source extent, an offset value that refers to a distance in blocks from a known location of the data container and a reference count value that provides a number of data containers that reference the source extent identifier.

The method further includes updating a data structure for a cloned version of the data container for storing the new extent identifier that points to the source extent identifier. The updated data structure includes an extent length value that is different from the length value of the source data structure and an offset value that is different from the offset value of the source data structure.

In yet another embodiment, a storage server is provided. The storage server includes a memory and a processor coupled to the memory through a bus. The processor executes instructions that cause the processor to generate a new extent identifier for cloning a portion of a source extent identified by a source extent identifier that is stored at a source data structure. The source extent includes a group of contiguous blocks for storing a data container and the source data structure includes a length value providing a length of the source extent, an offset value that refers to a distance in blocks from a known location of the data container and a reference count value that provides a number of data containers that reference the source extent identifier.

The processor also updates a data structure for a cloned version of the data container for storing the new extent identifier that points to the source extent identifier. The updated data structure includes an extent length value that is different from the length value of the source data structure; and an offset value that is different from the offset value of the source data structure.

In another embodiment, a machine implemented method is provided. The method includes generating by a storage server a new extent identifier for cloning a portion of a source extent identified by a source extent identifier that is stored at a source data structure used for providing attributes of the source extent. The source extent includes a group of contiguous block for storing a data container and the source data structure includes a length value providing a length of the source extent, an offset value that refers to a distance in blocks from a known location of the data container and a reference count value that provides a number of data containers that reference the source extent identifier.

The method further includes updating a data structure for a cloned version of the data container for storing the new extent identifier that points to the source extent identifier and the updated data structure includes an extent length value that is different from the length value of the source data structure; and an offset value that is different from the offset value of the source data structure. When a cloning request is to clone the entire source extent then the source extent identifier is also used for the cloned version and a reference count value of the data structure for the cloned version indicates that the source extent identifier is referenced by both the data container and the cloned version.

In yet another embodiment, a storage server is provided. The storage server includes a memory for storing an indirect volume entry for a source extent identified by a source extent identifier that is stored at a source data structure that maps to a physical block number (PVBN), which points to a physical storage space where information for the source extent is stored. The source extent includes a group of contiguous blocks for storing a data container and the source data structure includes a length value providing a length of the source extent, an offset value that refers to a distance in blocks from a known location of the data container and a reference count value that provides a number of data containers that reference the source extent identifier.

The server further includes a processor coupled to the memory via an inter-connect. The processor executes instructions that cause the processor to generate a new extent identifier for cloning a portion of the source extent and update a data structure for a cloned version of the data container for storing the new extent identifier that points to the source extent identifier. The updated data structure includes an extent length value that is different from the length value of the source data structure and an offset value that is different from the offset value of the source data structure.

The embodiments using the extent based architecture described above have advantages in performing cloning/partial cloning. The storage system does not have to navigate through a complex conversion process involving VVBN, especially where compression and partial cloning is involved. Instead, extent map entries are efficiently used for generating complete and/or partial clones.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 7 illustrates an exemplary volume layer indirect entry for a leaf node of the extent-based data structure of FIG. 6 when used to implement an indirect volume;

FIG. 8 illustrates an exemplary extent map entry for a leaf node of the extent-based data structure of FIG. 6 when used to implement an extent-to-physical block map;

FIG. 9 illustrates an exemplary sequence of look ups in the volume layer and aggregate layer of an extent-based storage architecture to map an FBN to a PVBN;

FIG. 11 provides examples of extent map entries in an extent-based architecture, according to one embodiment.

DETAILED DESCRIPTION

Figure 1:
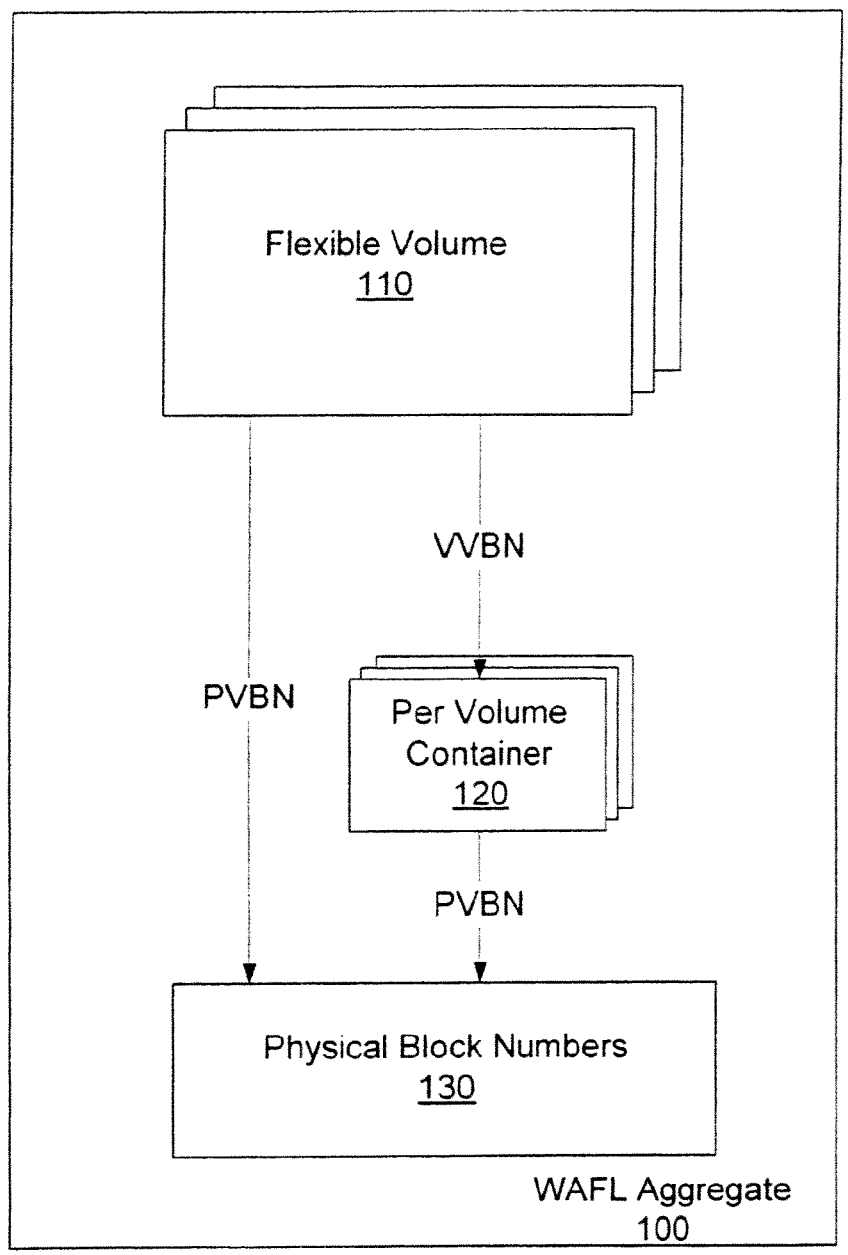
FIG. 1 illustrates a prior art exemplary implementation of an embodiment of a Write Anywhere File Layout.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a machine implemented method and an extent-based architecture for a storage server is provided. In response to a cloning request to clone a portion of a source extent, the storage server generates a new extent identifier that is stored at a source data structure. The source extent includes a group of contiguous blocks for storing a data container. The source data structure includes a length value providing a length of the source extent, an offset value that refers to a distance in blocks from a known location of the data container and a reference count value that provides a number of data containers that reference the source extent identifier.

The storage server updates a data structure for a cloned version of the data container for storing the new extent identifier that points to the source extent identifier. The updated data structure also includes an extent length value that is different from the length value of the source data structure and an offset value that is different from the offset value of the source data structure.

FIG. 1 is an example of a conventional example Write Anywhere File Layout (WAFL) file system. WAFL aggregate 100 is an instance of the WAFL file system. WAFL aggregate 100 includes one or more flexible volumes 110, one or more volume containers 120, and physical storage represented by physical block numbers 130.

WAFL aggregate 100 is a physical storage container that can store data in the WAFL file system. Flexible volume 110 is a logical volume that allows virtualization of the allocation of volumes on physical storage 130. Thereby multiple, independently managed flexible volumes 110 can share the same physical storage (e.g., physical storage 130). The virtualization requires mapping between virtual volume block numbers (VVBNs) used by flexible volume 110 and physical volume block numbers (PVBNs) used by WAFL aggregate 100 to access data stored in physical storage 130. A PVBN, as used herein, refers to storage device blocks that have been abstracted into a single linear sequence in the aggregate.

The term storage volume or volume as used herein means a logical data set which is an abstraction of physical storage, combining one or more physical mass storage devices or parts thereof into a single logical storage object. However, each storage volume can represent the storage space in one storage device, an aggregate of some or all of the storage space in multiple storage devices, a RAID group, or any other set of storage space.

Each volume container 120 corresponds to a flexible volume 110. Volume container 120 contains all the data blocks for a corresponding flexible volume 110.

As used herein, a block offset or an offset refers to a distance in blocks from the beginning of a storage object/data container such as a volume, file, or extent etc. Block addresses used within flexible volume 110 refer to block offsets within volume container 120. Since volume container 120 contains every block within flexible volume 110, there are two ways to refer to the location of a particular block. The PVBN specifies the location of a block within WAFL aggregate 100. The VVBN specifies the offset of the block within the container file.

When a block in a file is requested, flexible volume 110 translates the file offset into a VVBN. The VVBN is passed from flexible volume 110 to volume container 120. Volume container 120 translates the VVBN to a PVBN. The PVBN is then used to access the requested block in physical storage 130. Additionally, when a PVBN is initially written, the block pointer for the PVBN in flexible volume 110 is written to include the PVBN for the VVBN. Thereby, when the requested block is required, the flexible volume 110 can use the stored PVBN to access physical storage 130.

Current implementations of WAFL define a file as a tree of indirect blocks. Each indirect block in the tree has a fixed span i.e. a fixed number of entries, each pointing to another block in the tree. As a result, the amount of indirect block metadata is linear with respect to the size of the file. Additionally, storage device gardening techniques, such as segment cleaning, file reallocation, etc., are complicated by caching PVBN pointers in VVBN blocks.

Storage systems often use a predetermined block size for all internal operations. For example, WAFL may use 4 KB (e.g., 4096 bytes) blocks for both VVBN and PVBN, as do client-side file systems for file block numbers (FBN). Block boundaries are expected to occur every 4 KB from an initial offset (e.g., FBN 0). Since file systems usually offset individual data containers based on these block boundaries, application writers take advantage of a file system's block size and alignment to increase the performance of their input/output ("I/O") operations—for example, always performing I/O operations that are a multiple of 4 KB, and always aligning these operations to the beginning of a file. Other file systems or applications, such as a virtual machine, may use a block boundary of a different size (e.g., a virtual machine environment in which an initial master boot record block of 512 bytes is followed by the expected 4 KB blocks), resulting in misalignment between FBN's and PVBN's. Additionally, multiple virtual machines may share a single volume container 120 and each virtual machine may misaligned by a different amount.

The embodiments disclosed herein provide an extent based architecture that overcomes the shortcomings of the architecture of FIG. 1. Extents are represented using an entry for each block within an extent. An extent, as used herein, refers to a contiguous group of one or more blocks.

Figure 2A:
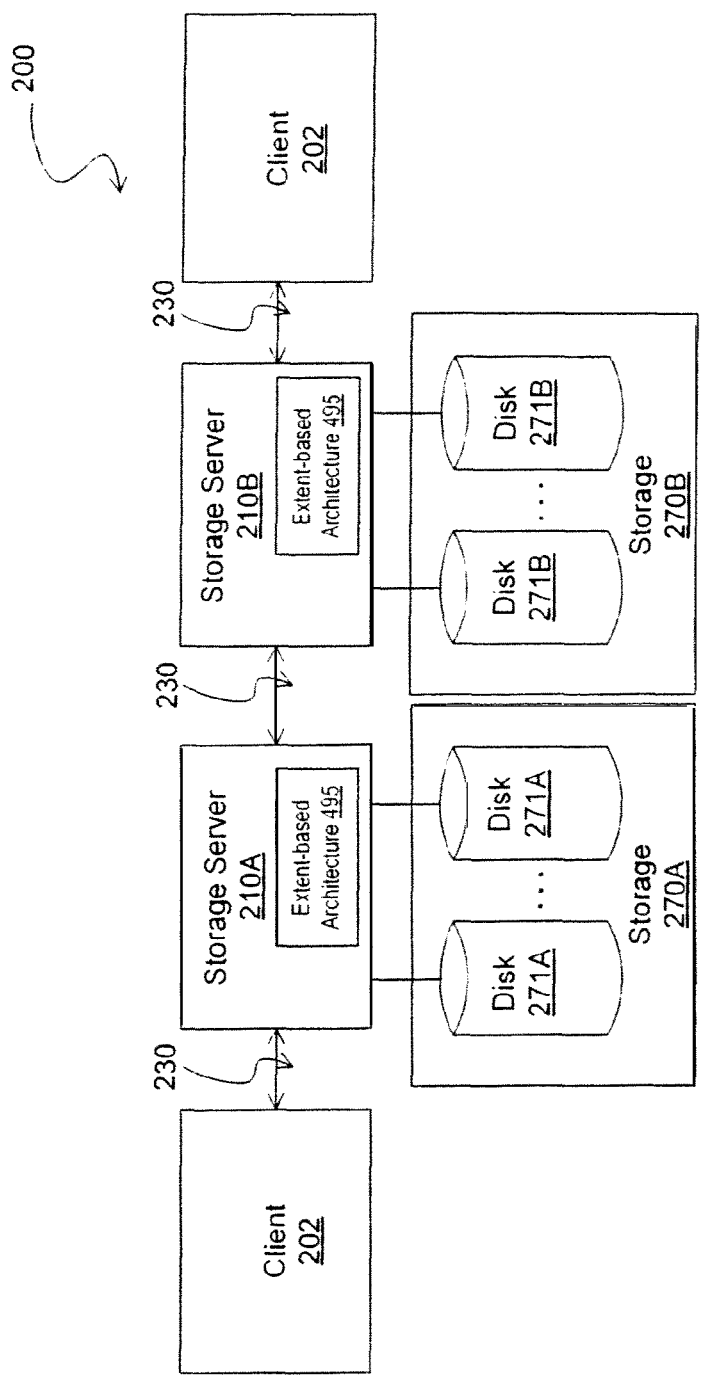
FIG. 2A illustrates a network storage system in which an extent-based storage architecture may be implemented.

FIG. 2A shows a system 200 in which an extent-based storage architecture 495 can be implemented, according to one embodiment. The extent-based storage architecture 495 is described below in detail with respect to FIG. 5 and enables a storage system to process partial cloning requests for partially cloning a data container that may have compressed or uncompressed data blocks.

Storage servers (may also be referred to as storage systems) 210 (storage servers 210A, 210B) each manage multiple storage units 270 (storage 270A, 270B) that include mass storage devices. These storage servers 210 provide data storage services to one or more clients 202 through a network 230. Network 230 may be, for example, a local area network (LAN), wide area network (WAN), metropolitan area network (MAN), global area network (GAN) such as the Internet, a Fibre Channel fabric, or any combination of such interconnects. Each of clients 202 may be, for example, a conventional personal computer (PC), server-class computer, workstation, handheld computing or communication device, a virtual machine, or other special general purpose computer.

Data storage at storage units 270 is managed by storage servers 210, which receive and respond to various I/O requests from clients 202, directed to data stored in or to be stored in storage units 270. Data is accessed (e.g., in response to the I/O requests) in units of blocks, which in the present embodiment are 4 KB in size, although other block sizes (e.g., 512 bytes, 2 KB, 8 KB, etc.) may also be used. For one embodiment, 4 KB as used herein refers to 4,096 bytes. For an alternate embodiment, 4 KB refers to 4,000 bytes. Storage units 270 constitute mass storage devices which can include, for example, flash memory, magnetic or optical disks, or tape drives, illustrated as disks 271 (271A, 271B). The storage devices 271 can further be organized into arrays (not illustrated) implementing a Redundant Array of Inexpensive Disks/Devices (RAID) scheme, whereby storage servers 210 access storage units 270 using one or more RAID protocols. Although illustrated as separate components, for one embodiment, a storage server 210 and storage unit 270 may be a part of/housed within a single device.

Storage servers 210 can provide file-level service such as used in a network-attached storage (NAS) environment, block-level service such as used in a storage area network (SAN) environment, a service which is capable of providing both file-level and block-level service, or any other service capable of providing other data access services. Although storage servers 210 are each illustrated as single units in FIG. 2A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CFS), Network File System (NFS), or an Internet Protocol (IP) module, for facilitating such connectivity. Details of a distributed architecture environment involving D-modules and N-modules are described further below with respect to FIG. 2B and embodiments of a D-module and a N-module are described further below with respect to FIG. 4.

In yet other embodiments, storage servers 210 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup or secondary storage server connected to a primary storage server. A network storage subsystem can also be implemented with a collection of networked resources provided across multiple storage servers and/or storage units.

In the embodiment of FIG. 2A, one of the storage servers (e.g., storage server 210A) functions as a primary provider of data storage services to client 202. Data storage requests from client 202 are serviced using disks 271A organized as one or more storage objects. A secondary storage server (e.g., storage server 210B) takes a standby role in a mirror relationship with the primary storage server, replicating storage objects from the primary storage server to storage objects organized on disks of the secondary storage server (e.g., disks 270B). In operation, the secondary storage server does not service requests from client 202 until data in the primary storage object becomes inaccessible such as in a disaster with the primary storage server, such event considered a failure at the primary storage server. Upon a failure at the primary storage server, requests from client 202 intended for the primary storage object are serviced using replicated data (i.e. the secondary storage object) at the secondary storage server.

It will be appreciated that in other embodiments, network storage system 200 may include more than two storage servers. In these cases, protection relationships may be operative between various storage servers in system 200 such that one or more primary storage objects from storage server 210A may be replicated to a storage server other than storage server 210B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 210 should be taken as illustrative only.

Figure 2B:
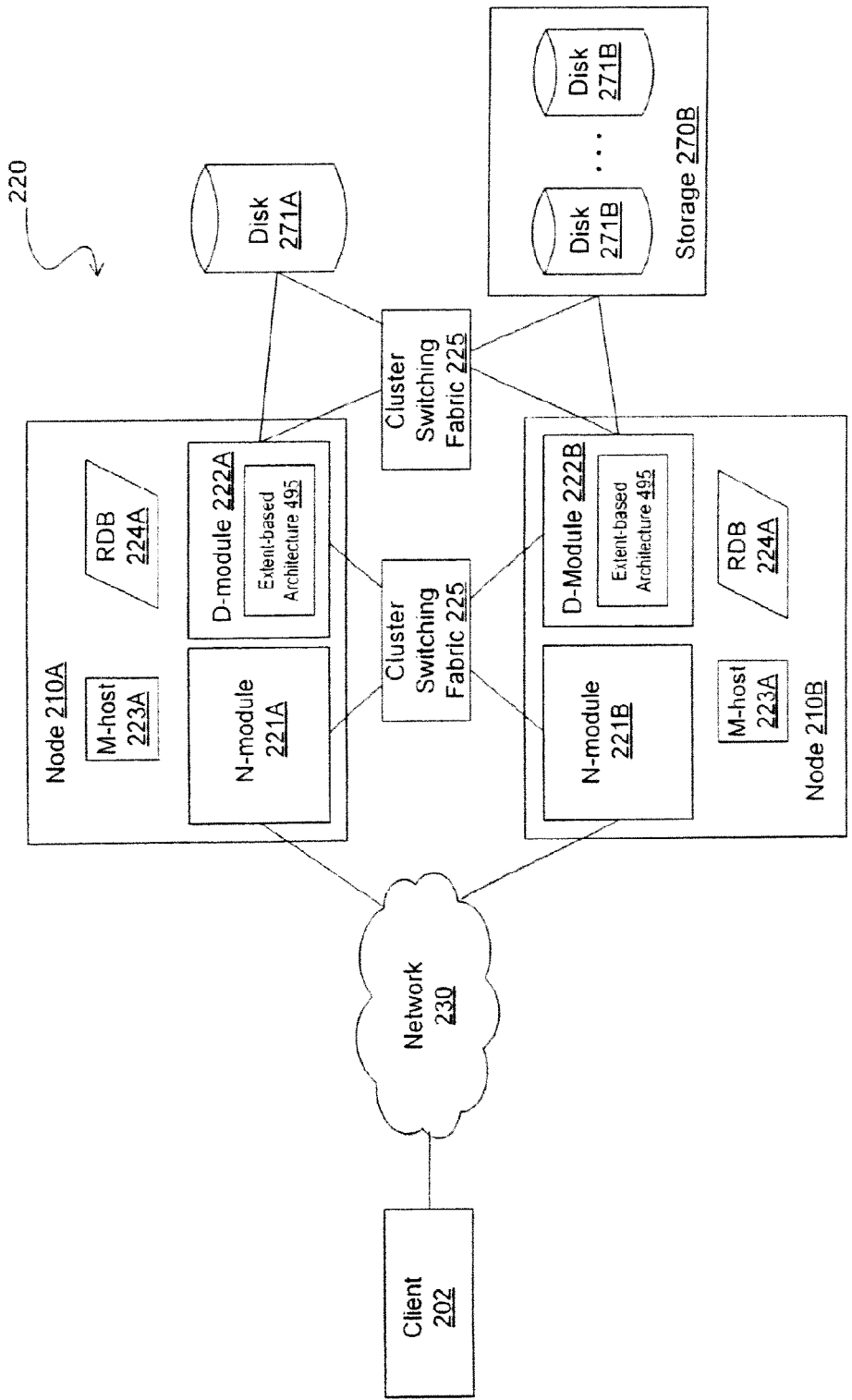
FIG. 2B illustrates a distributed or clustered architecture for a network storage system in which an extent-based storage architecture may be implemented in an alternative embodiment.

FIG. 2B illustrates a block diagram of a distributed or clustered system 220, according to one embodiment. System 220 may include storage servers implemented as nodes 210 (nodes 210A, 210B) which are each configured to provide access to storage devices 271. In FIG. 2B, nodes 210 are interconnected by a cluster switching fabric 225, which may be embodied as an Ethernet switch.

Nodes 210 may be operative as multiple functional components that cooperate to provide a distributed architecture of system 220. To that end, each node 210 may be organized as a network element or module (N-module 221A, 221B), a disk element or module (D-module 222A, 222B), and a management element or module (M-host 223A, 223B). In one embodiment, each module includes a processor and memory for carrying out respective module operations. For example, N-module 221 may include functionality that enables node 210 to connect to client 202 via network 230 and may include protocol components such as a media access layer, IP layer, Transport Control Protocol (TCP) layer, User Datagram Protocol (UDP) layer, and other protocols known in the art.

In contrast, D-module 222 may connect to one or more storage devices 271 via cluster switching fabric 225 and may be operative to service access requests on devices 270. In one embodiment, the D-module 222 implements an extent-based storage architecture 495, as will be described in greater detail below. In one embodiment, the D-module 222 includes storage access components such as a storage abstraction layer supporting multi-protocol data access (e.g., the CFS protocol, the NFS protocol, and the Hypertext Transfer Protocol), a storage layer implementing storage protocols (e.g., RAID protocol), and a driver layer implementing storage device protocols (e.g., Small Computer Systems Interface (SCSI) protocol) for carrying out operations in support of storage access operations.

In the embodiment shown in FIG. 2B, a storage abstraction layer (e.g., file system) of the D-module divides the physical storage of devices 270 into storage objects. Requests received by node 210 (e.g., via N-module 221) may thus include storage object identifiers to indicate a storage object on which to carry out the request.

Also operative in node 210 is M-host 223 which provides cluster services for node 210 by performing operations in support of a distributed storage system image, for instance, across system 220. M-host 223 provides cluster services by managing a data structure such as a RDB 224 (RDB 224A, RDB 224B) which contains information used by N-module 221 to determine which D-module 222 "owns" (services) each storage object. The various instances of RDB 224 across respective nodes 210 may be updated regularly by M-host 223 using conventional protocols operative between each of the M-hosts (e.g., across network 230) to bring them into synchronization with each other. A client request received by N-module 221 may then be routed to the appropriate D-module 222 for servicing to provide a distributed storage system image.

It should be noted that while FIG. 2B shows an equal number of N- and D-modules constituting a node in the illustrative system, there may be different number of N- and D-modules constituting a node in accordance with various embodiments disclosed herein. For example, there may be a number of N-modules and D-modules of node 210A that does not reflect a one-to-one correspondence between the N- and D-modules of node 210B. As such, the description of a node comprising one N-module and one D-module for each node should be taken as illustrative only.

Figure 3:
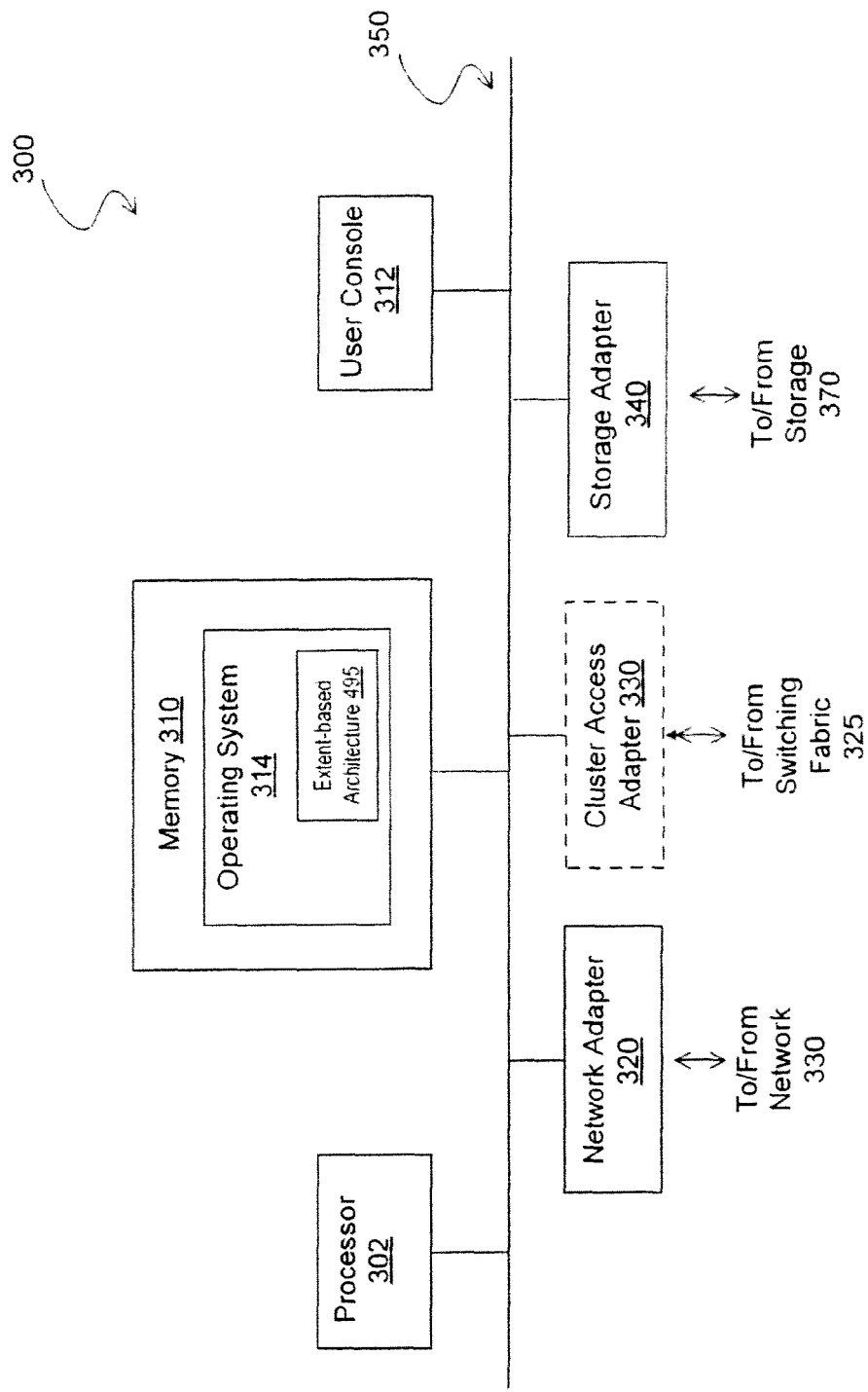
FIG. 3 is a block diagram of an illustrative embodiment of the hardware architecture of a storage server in which an extent-based storage architecture may be implemented.

FIG. 3 is a block diagram of an embodiment of a storage server 300, such as storage servers 210A and 210B of FIG. 2A, embodied as a general or special purpose computer. Storage server 300 maintains an indirect volume layer entry (See FIG. 5) for each extent identified by an extent identifier. The extent identifier maps to a source data structure (also referred to as an extent map entry (See FIG. 8)) described below in more detail. The format and layout of the extent map entry enables storage server 300 to efficiently partially clone a data container, as described below in more detail.

Storage server 300 includes a processor 302, a memory 310, a network adapter 320, a user console 312 and a storage adapter 340 interconnected by a bus system 350. The bus system 350, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). Certain standard and well-known components, which are not germane to the understanding of embodiments of the present invention, are not shown.

Storage server 300 includes a processor 302, configured to operate as a central processing unit (CPU) and, thus, control the overall operation of storage server 210. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 302 executes software stored in memory 310. For one embodiment, multiple processors 302 or one or more processors 302 with multiple cores are included in the storage server 210. For one embodiment, individual adapters (e.g., network adapter 320 and storage adapter 340) each include processor and memory for carrying out respective module operations.

Memory 310 includes storage locations addressable by processor 302, network adapter 320 and storage adapter 340 for storing processor-executable instructions and data structures associated with implementation of an extent-based storage architecture. Storage operating system 314, portions of which is typically resident in memory 310 and executed by processor 302, functionally organizes the storage server 210 by invoking operations in support of the storage services provided by the storage server 210. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 302 and executable software can be implemented by hardware, such as integrated currents configured as programmable logic arrays, ASICs, and the like.

Network adapter 320 comprises one or more ports to couple the storage server to one or more clients over point-to-point links or a network. Thus, network adapter 320 includes the mechanical, electrical and signaling circuitry needed to couple the storage server to one or more client over a network. The network adapter 320 may include protocol components such as a Media Access Control (MAC) layer, CIFS, NFS, IP layer, TCP layer, UDP layer, and other protocols known in the art for facilitating such connectivity. Each client may communicate with the storage server over the network by exchanging discrete frames or packets of data according to pre-defined protocols, such as TCP/IP.

Storage adapter 340 includes a plurality ports having input/output (I/O) interface circuitry to couple the storage devices (e.g., disks) to bus 350 over an I/O interconnect arrangement, such as a conventional high-performance, FC or SAS link topology. Storage adapter 340 typically includes a device controller (not illustrated) comprising a processor and a memory for controlling the overall operation of the storage units in accordance with read and write commands received from storage operating system 314. In one embodiment, the storage operating system 314 implements an extent-based storage architecture 495, as will be described in greater detail below. As used herein, data written by a device controller in response to a write command is referred to as "write data," whereas data read by device controller responsive to a read command is referred to as "read data."

User console 312 enables an administrator to interface with the storage server to invoke operations and provide inputs to the storage server using a command line interface (CLI) or a graphical user interface (GUI). In one embodiment, user console 312 is implemented using a monitor and keyboard.

When implemented as a node of a cluster, such as cluster 220 of FIG. 2B, the storage server further includes a cluster access adapter 330 (shown in phantom/broken lines) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 4:
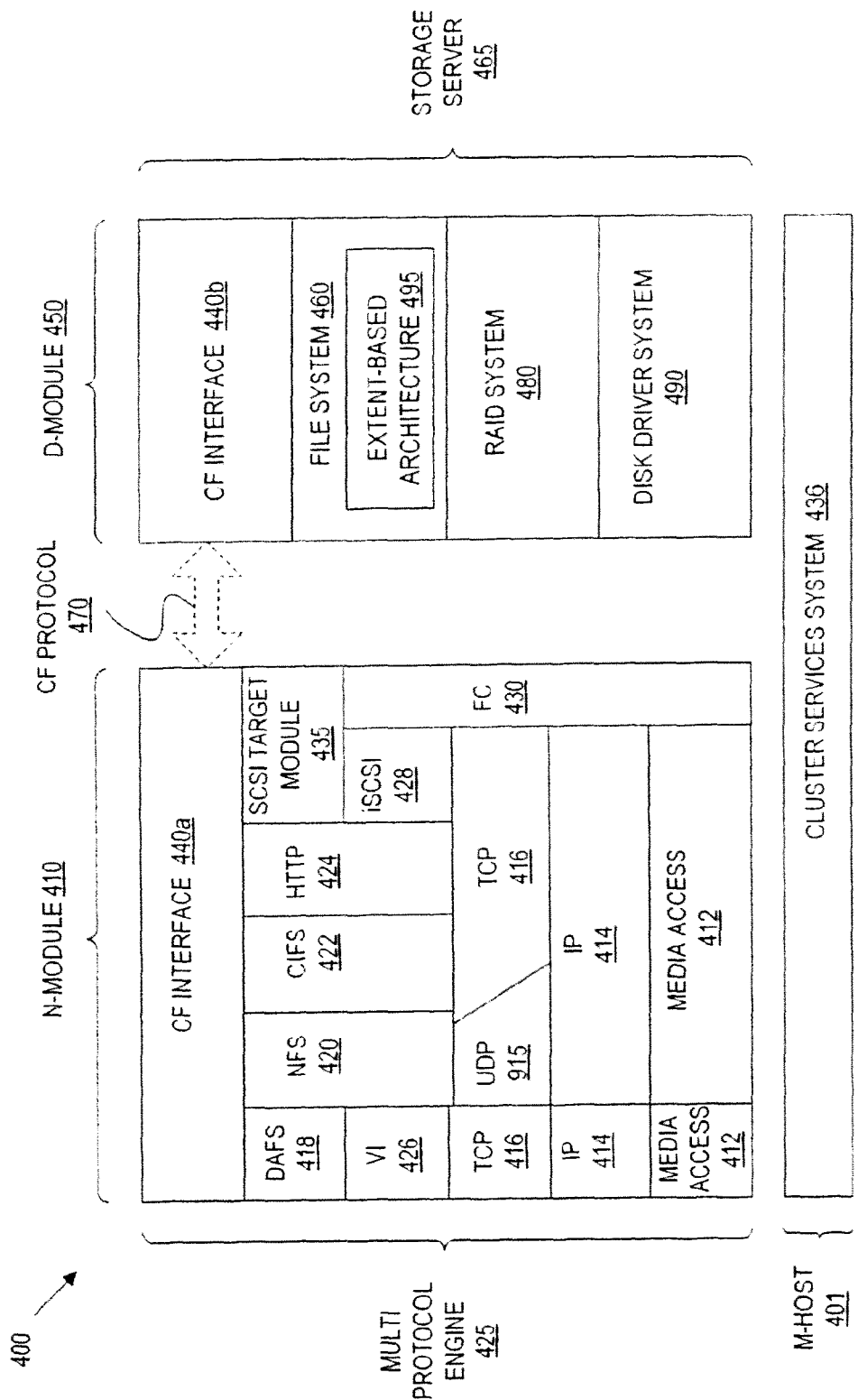
FIG. 4 illustrates an embodiment of the storage operating system of FIG. 3 in which an extent-based storage architecture may be implemented.

FIG. 4 is a block diagram of a storage operating system, such as storage operating system 314 of FIG. 3 that implements an embodiment of an extent-based architecture 495. The storage operating system 314 maintains an indirect volume layer entry (See FIG. 5) for each extent identified by an extent identifier. The extent identifier maps to a source data structure (also referred to as an extent map entry (See FIG. 8)) described below in more detail. The format and layout of the extent map entry enables storage operating system 314 to efficiently partially clone a data container, as described below in more detail.

The storage operating system 314 comprises a series of software layers executed by a processor, such as processor 302 of FIG. 3, and organized to form an integrated network protocol stack or, more generally, a multi-protocol engine 425 that provides data paths for clients to access information stored on the storage server using block and file access protocols.

Multi-protocol engine 425 includes a media access layer 412 of network drivers (e.g., gigabit Ethernet drivers) that interface with network protocol layers, such as the IP layer 414 and its supporting transport mechanisms, the TCP layer 416 and the UDP layer 415. A file system protocol layer provides multi-protocol file access and, to that end, includes support for one or more of the Direct Access File System (DAFS) protocol 418, the NFS protocol 420, the CIFS protocol 422 and the HTTP protocol 424. A VI layer 426 implements the VI architecture to provide direct access transport (DAT) capabilities, such as RDMA (remote direct memory access), as required by the DAFS protocol 418. An iSCSI driver layer 428 provides block protocol access over the TCP/IP network protocol layers, while a FC (Fibre Channel) driver layer 430 receives and transmits block access requests and responses to and from the storage server. In certain cases, a Fibre Channel over Ethernet (FCoE) layer (not shown) may also be operative in multi-protocol engine 425 to receive and transmit requests and responses to and from the storage server. The FC and iSCSI drivers provide respective FC and iSCSI-specific access control to the blocks and, thus, manage exports of luns to either iSCSI or FCP or, alternatively, to both iSCSI and FCP when accessing data blocks on the storage server.

The storage operating system also includes a series of software layers organized to form a storage server 465 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement.

The file system 460 implements a virtualization system of the storage operating system through the interaction with one or more virtualization modules (illustrated as a SCSI target module 435). The SCSI target module 435 is generally disposed between drivers 428, 430 and the file system 460 to provide a translation layer between the data block (lun) space and the file system space, where luns are represented as data blocks. In one embodiment, the file system 460 implements a WAFL file system having an on-disk format representation that is block-based using, e.g., 4 KB blocks and using a data structure such as index nodes ("inodes") to identify files and file attributes (such as creation time, access permissions, size and block location). File system 460 uses files to store metadata describing the layout of its file system, including an mode file, which directly or indirectly references (points to) the underlying data blocks of a file. For one embodiment, the file system 460 includes an extent-based architecture 495 as an extension to WAFL.

Operationally, a request from a client is forwarded as a packet over the network and onto the storage server where it is received at a network adapter. A network driver such as layer 412 or layer 430 processes the packet and, if appropriate, passes it on to a network protocol and file access layer for additional processing prior to forwarding to file system 460. There, file system 460 generates operations to load (retrieve) the requested data from the disks if it is not resident "in core", i.e., in memory 310. If the information is not in memory, file system 460, in cooperation with the extent-based architecture 495, accesses an indirect volume to retrieve an extent identifier, accesses an extent-to-physical block map to retrieve a PVBN as described in greater detail below. For one embodiment, the file system 460 passes the PVBN to the RAID system 480. There, the PVBN is mapped to a disk identifier and device block number (disk, DBN) and sent to an appropriate driver of disk driver system 490. The disk driver accesses the DBN from the specified disk and loads the requested data block(s) in memory for processing by the storage server. Upon completion of the request, the node (and operating system 314) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 320, 340 may be configured to offload some or all of the packet processing and storage access operations, respectively, from processor 302, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 450 for accessing data stored on disk. In contrast, multi-protocol engine 425 may be embodied as N-module 410 to perform protocol termination with respect to a client issuing incoming access over the network, as well as to redirect the access requests any other N-module in the cluster. A cluster services system 436 may further implement an M-host (e.g., M-host 401) to provide cluster services for generating information sharing operations to present a distributed file system image for the cluster. For instance, media access layer 412 may send and receive information packets between the various cluster services systems of the nodes to synchronize the replicated databases in each of the nodes.

In addition, a cluster fabric (CF) interface module 440 (CF interface modules 440A, 440B) may facilitate intra-cluster communication between N-module 410 and D-module 450 using a CF protocol 470. For instance, D-module 450 may expose CF application programming interface (API) to which N-module 410 (or another D-module not shown) issues calls. To that end, CF interface module 440 can be organized as a CF encoder/decoder using local procedure calls (LPCs) and remote procedure calls (RPCs) to communicate a file system command to between D-modules residing on the same node and remote nodes, respectively.

Although embodiments of the present invention are shown herein to implement an extent-based architecture within the illustrated components and layers of a storage server, it will be appreciated that an extent-based architecture may be implemented in other modules or components of the storage server in other embodiments. In addition, an extent-based architecture may be implemented as one or a combination of a software-executing processor, hardware or firmware within the storage server. As such, an extent-based architecture may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write-in-place file systems.

Figure 5:
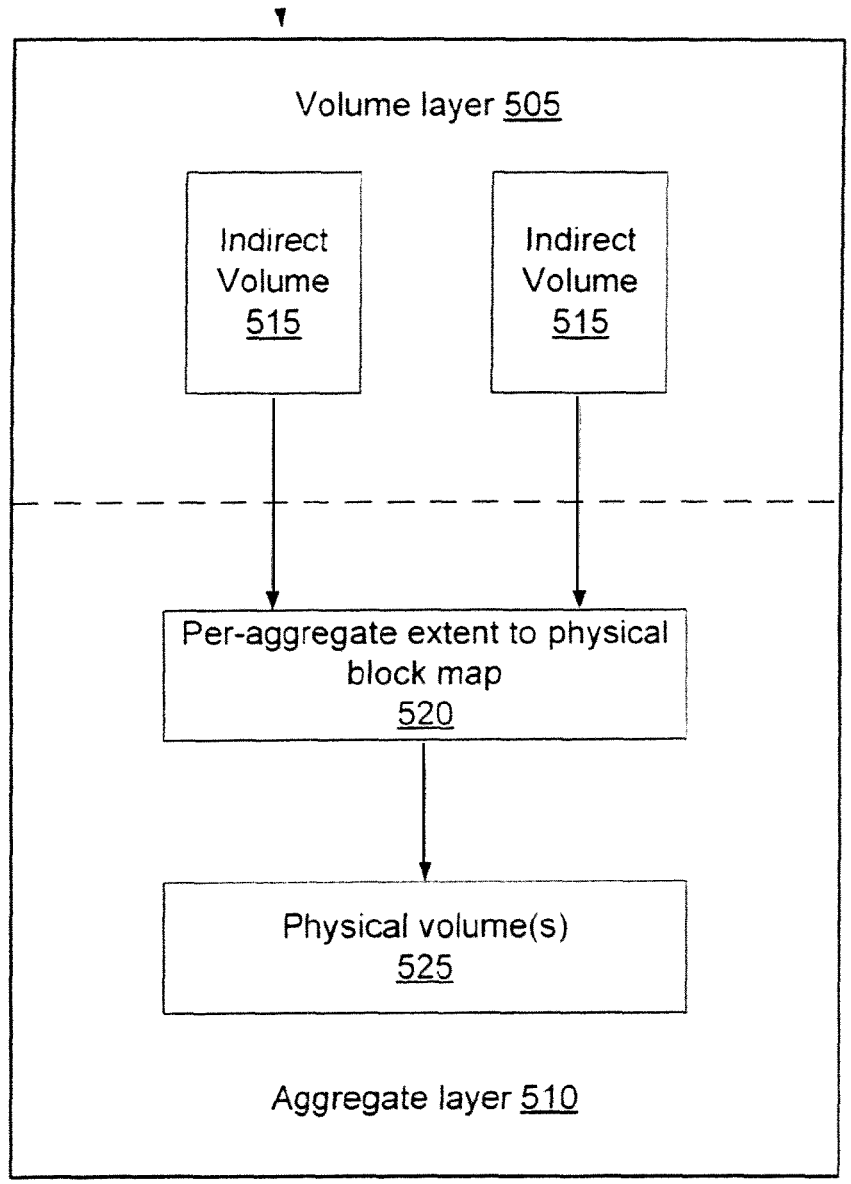
FIG. 5 illustrates an exemplary block diagram of an extent-based storage architecture.

FIG. 5 illustrates a block diagram of the extent-based storage architecture 495, according to one embodiment. The extent-based architecture 495 maintains an indirect volume layer entry for each extent identified by an extent identifier. The extent identifier maps to a source data structure (also referred to as an extent map entry) described below in more detail. The format and layout of the extent map entry enables storage operating system 314 to efficiently partially clone a data container, as described below in more detail.

The extent-based architecture 495 includes a volume layer 505 and an aggregate or region manager layer 510. The volume layer 505 includes one or more indirect volumes 515 to indirectly map an I/O request from a client 202 to one or more physical blocks within storage devices 271 (FIG. 2A).

In one embodiment, the storage server 210 uses one entry in the indirect volumes 515 for each extent, as opposed to prior art block-based implementations that used one indirect volume entry (e.g., in a flexible volume 110) for each data block. For one embodiment, the I/O request references data by way of a file block number (FBN). An FBN refers a data block in an indirect volume 515 as referenced by a client 202. The storage server 210 uses the FBN as a key to access an extent identifier (or extent ID). An extent refers to a contiguous group of one more data blocks in a FBN space. The aggregate layer 510 includes an extent-to-physical block map 520 and one or more physical volumes 525. The extent-to-physical block map 520 maps an extent identifier (e.g., accessed by way of an FBN in the volume layer 505) to a pointer to another extent or to one or more PVBN in the physical volume 525.

The extent-based entries of the extent-to-physical block map 520 provide per-aggregate indirection. In contrast, virtual volume block numbers (VVBN) of volume containers 120 provide per-volume indirection. A per-aggregate extent-based entry, as used herein, refers to an extent being unique across volume boundaries within an aggregate. A per-volume indirect entry refers to an entry being unique within volume boundaries. For per-aggregate indirection, when the storage server 210 copies, moves, or makes other changes to physical blocks, the changes are reflected within the aggregate layer 510 in the extent-to-physical block map 520. These changes, however, do not need to be propagated into the volume layer 505 because the extent identifier does not need to change. This enables compression, decompression, sharing, and the termination of sharing of extents to occur without communication with the volume layer 505 as described below in more detail. Blocks can be easily shared across volume boundaries, enabling cross-volume de-duplication. Segment cleaning and related disk gardening techniques can be performed on the extent-to-physical block map 520 in a single pass, all without having to propagate changes up into the volume layer 505.

Figure 6:
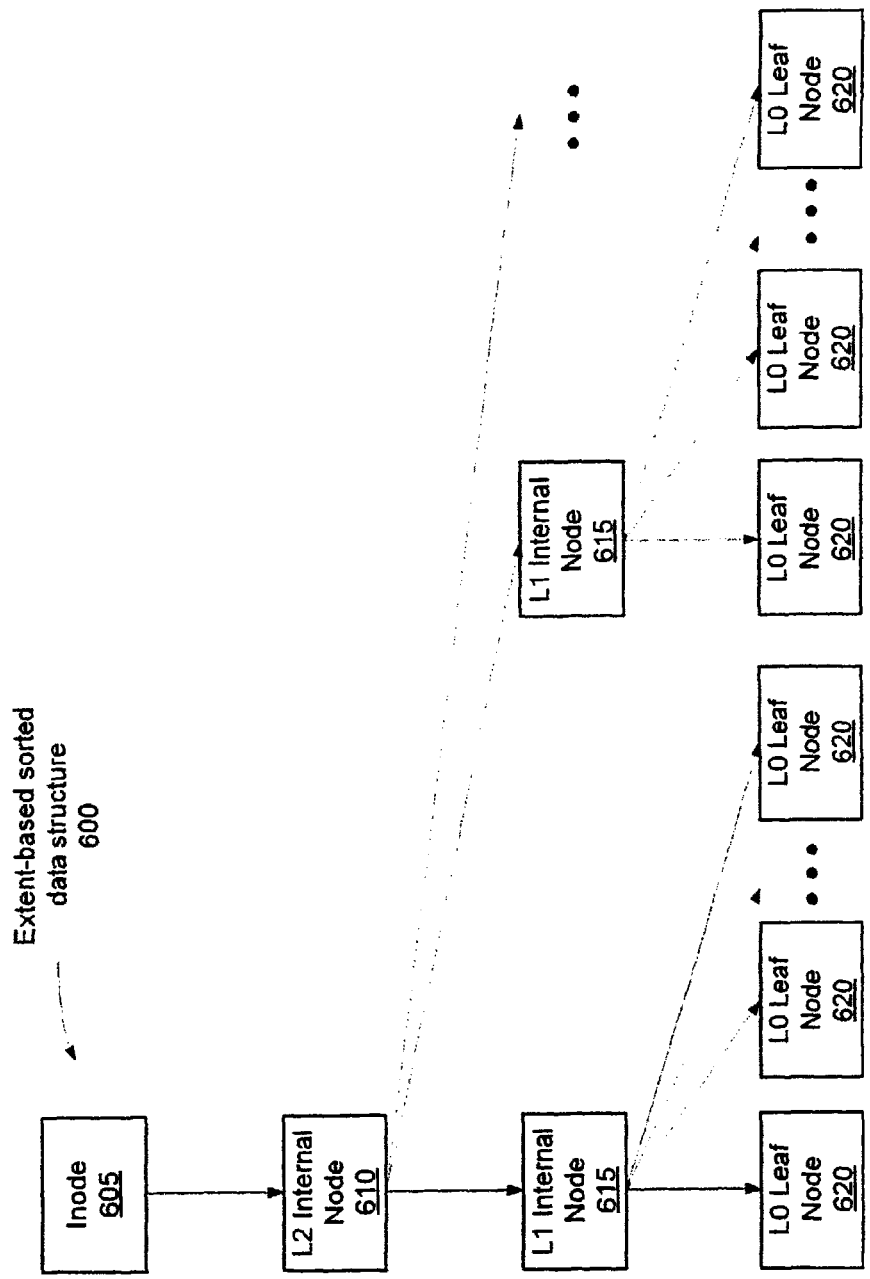
FIG. 6 illustrates an exemplary extent-based sorted data structure within an extent-based storage architecture.

FIG. 6 shows an example of an extent-based sorted data structure 600 within the extent-based storage architecture 495, according to one embodiment. Extent based data structure 600 may include an inode 605 that points to the root of the extent-based tree/sorted data structure 600 and contains volume/file metadata and pointers to data blocks 620 or indirect blocks 610/615. As an example, indirect blocks are referred to as internal nodes 610/615 and data blocks are referred to as leaf nodes 620. For one embodiment, the inode 605 points to one or more branches of internal nodes 610/615. For an alternate embodiment, the inode 605 points directly to the leaf nodes 620. For one embodiment, the internal nodes 610/615 store pointers to other nodes but do not store data, e.g. data such as an FBN, extent identifier, PVBN, etc. The leaf nodes 620, on the other hand, store data, e.g. data such as an FBN, extent identifier, PVBN, etc.

For one embodiment, the lengths of extents vary. For one embodiment the length of an extent is expressed as the number of data blocks of a fixed size within the extent. For example, an extent containing only a single 4 KB block would have a length of 1, an extent containing two 4 KB blocks would have a length of 2, etc. For one embodiment, extents have a maximum length driven by user I/O or write allocation (e.g., extents having a maximum length of 64 blocks). For an alternate embodiment, the length of extents may be consistently defined (e.g., 8 blocks).

For one embodiment, the storage server 210 uses an extent-based sorted data structure 600 to implement an indirect volume 515. FIG. 7 shows an exemplary volume layer indirect entry 700 for a leaf node 620 of an extent-based data structure 600 used to implement an indirect volume 515. The volume layer indirect entry 700 stores an FBN 705, a corresponding extent identifier 710, and a length of the extent 715. The storage server 210 uses the FBN 705 as the primary sorting key to navigate the extent-based sorted data structure 600 and find the extent identifier 710 that corresponds to the FBN 705. For one embodiment, the FBN 705 is 48 bits, the extent identifier 710 is 48 bits, and the length 715 is 8 bits. Alternatively, the storage server 210 uses different sizes for one or more of the FBN 705, extent identifier 710, or length 715. For example, the extent identifier 710 may be 64 bits long in an alternate embodiment to, e.g., provide for 512 byte granularity in the offsets of blocks. For one embodiment, extent lengths 715 vary. For an alternate embodiment, extent lengths 715 are fixed.

The storage server 210 allocates extent identifiers 710 during write allocation. For one embodiment, the storage server 210 allocates extent identifiers 710 from a finite pool. Alternatively, extent identifiers 710 are monotonically increasing values that never wrap. For one embodiment, the length 715 of an extent is used for a consistency check as described with reference to FIG. 8 below.

The per-volume container files 120 (FIG. 1) of previous implementations of WAFL are not used in an extent-based sorted data structure 600 used to implement an indirect volume 515. Instead of per-volume container files 120, the storage server 210 uses an extent-to-physical block map 520. As described above, the use of the extent-to-physical block map 520 can result in reduced indirect metadata. The indirect volume blocks, however, no longer contain cached pointers to PVBN's.

Access to an extent involves the storage server 210 looking up an extent identifier 710 in the indirect volume 515 and looking up the PVBN (e.g., by way of a pointer) in the extent-to-physical block map 520. The computational overhead of this additional I/O look-up is offset by some of the features of extent-based architecture 495. For example, I/O accesses are per extent rather than per block and, therefore, multiple blocks are accessed by a single I/O access of each the indirect volume 515 and the extent-to-physical block map 520. Additionally, the extent-based architecture 495 gains advantages in compression, deduplication, segment cleaning, etc., which can be performed with altering the extent identifier 710. Actions such as deduplication can easily span the aggregate rather than just a single volume and many changes to blocks, e.g., resulting from compression and segment cleaning, do not need to be propagated up to the indirect volume 515 (e.g., to correct cached indirect pointers as in previous implementations of WAFL).

FIG. 8 shows an example of an extent map entry 800, according to one embodiment that may be stored at a leaf node 620. Extent map entry 800 includes extent identifiers 805, references 810 such as a pointers to PVBN's or to other extent identifiers, offsets for the extents 815, and lengths for the extents 820. Extent map entry 800 further includes a reference count 825 and a compression value (or indicator) 830 that are described in more detail below.

As used herein, an offset for an extent is a distance in blocks from the first block for the contiguous group of blocks that make up an extent. For one embodiment, the extent identifier 805 is 48 bits, the pointer/extent identifier 810 is 48 bits, the offset 815 is 8 bits, and the length 820 is 8 bits. For an alternate embodiment, different numbers of bits are used for each portion of an extent map entry 800.

For one embodiment, each extent map entry 800 includes either a pointer or other reference 810 directly to a PVBN or to another extent identifier 805 that directly references a PVBN. For one embodiment, each PVBN is owned by only one extent and any other extent that references the PVBN does so by way of referencing the owner extent. As a result, the maximum additional look-up for a given extent to get to a PVBN should be no more than one. This maximum prevents the level of indirect references in extent map entries 800 from becoming arbitrarily deep and taking an arbitrary amount of time (as measured in terms of disk I/O operations, assuming that each extent entry is likely to be stored within a different disk block). As a result of extents having a single owner, the storage server 210 can use the owner extent identifier as a tag, unique number, or other context for the purpose of lost write detection.

For an alternate embodiment, all extent identifiers map directly to a PVBN and PVBN's can be owned by more than one extent. For an embodiment including lost write detection, the storage server 210 creates a context, tag, or unique number, e.g., via a separate table, that is separate/different from the extent identifiers 805 due to the possibility of multiple extent identifiers referencing a single PVBN.

For one embodiment, the storage server 210 utilizes a finite number of extent identifiers. If an extent identifier is a candidate to be reused, e.g., upon a request to delete the extent, the storage server 210 first determines whether or not other extents refer to that extent identifier. If one or more extents reference the candidate extent identifier, the storage server 210 ensures that the one or more extents continue to point to the same data (e.g., by altering one of the extents to directly reference the corresponding PVBN and the other extents to reference that altered extent).

Reference count 825 is maintained by storage server 210 in extent map entry 800 to indicate how many storage objects may be referencing a particular extent identifier. Reference count 825 enables the storage server 210 to be aware of whether or not other extents would be affected by operations performed on an extent/PVBN. In one embodiment, storage server 210 tracks increments and decrements the reference count in one or more log files. For example, the storage server 210 would increment a reference count when a new extent/PVBN is allocated, when an extent identifier is shared (e.g., via clone creation, snapshot creation, or de-duplication). For one embodiment, the storage server 210 accumulates increments and decrements using a log file and makes batch updates to reference count metafiles, e.g., at a consistency point. For one embodiment, the storage server 210 increments a reference count from 0 to 1 for a PVBN directly (bypassing the log file) when allocating a new extent/PVBN and executes all other increments and decrements of the reference counts via the respective reference count log file.

Compression value 830 may be used to indicate if blocks within an extent are compressed. The use of compression value 830 is described below in more detail.

FIG. 9 shows an exemplary sequence of look ups in the volume layer 505 and aggregate layer 510 to map an FBN to a PVBN in the physical volume 525. For example, when the storage server 210 receives an I/O request including an FBN 705, the storage server 210 uses the FBN as a key in an indirect volume 515 to look up an extent identifier 710 in a volume layer indirect entry 700. The storage server 210 uses the extent identifier 710 as a key to look up an extent map entry 800 in an extent-to-physical block map 520. The storage server 210 uses the pointer 810 to access PVBN 905 in the physical volume 525. In this example, the offset 815 is zero. If the offset was a positive value, the storage server 210 would access one or more blocks subsequent to PVBN 905 (e.g., PVBN 910, PVBN 915, etc.). If the length 820 is greater than 1, the storage server 210 would access PVBN 905 and one or more subsequent blocks (e.g., PVBN 910, PVBN 915, etc.).

Figure 10:
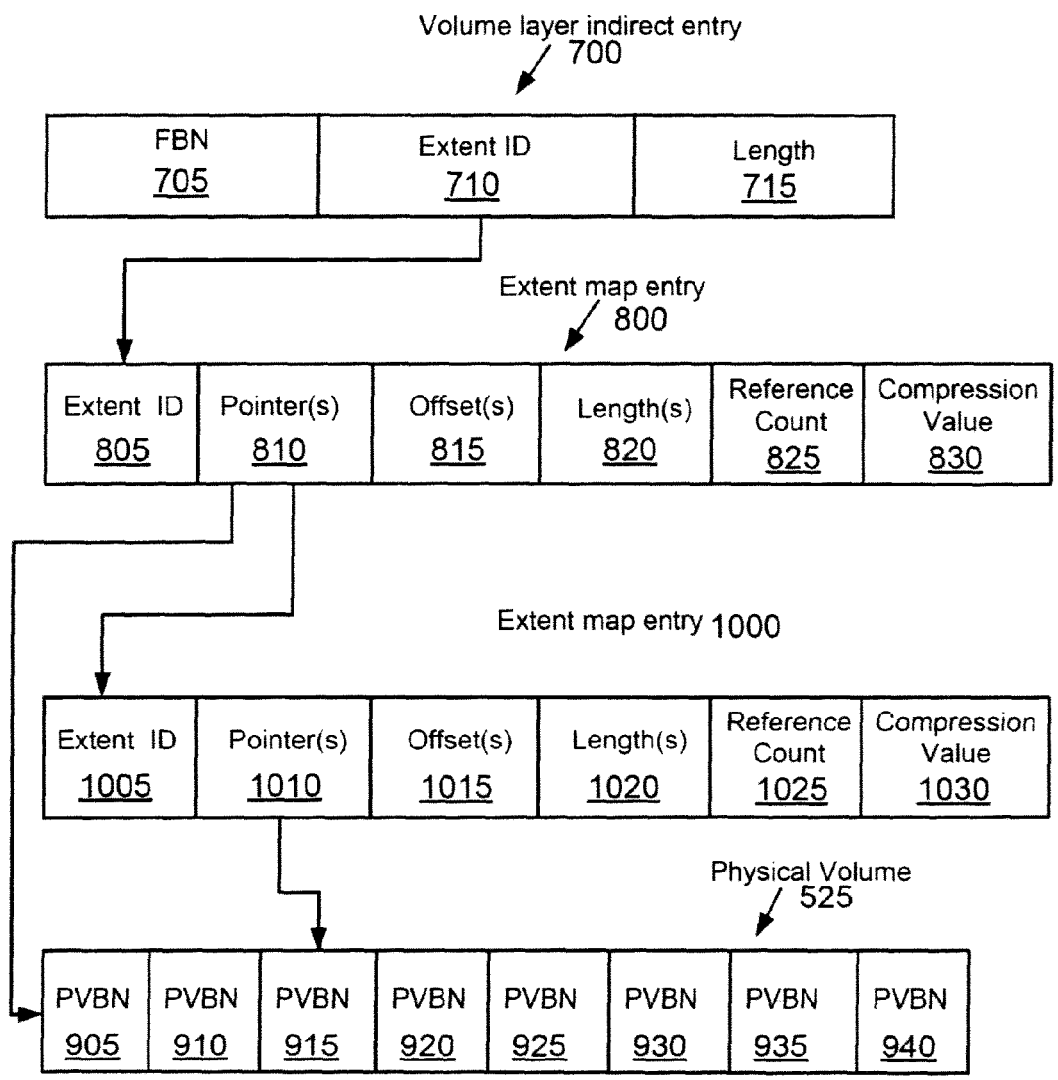
FIG. 10 illustrates another exemplary sequence of look ups in the volume layer and aggregate layer of an extent-based storage architecture to map an FBN to a PVBN.

FIG. 10 shows another exemplary sequence of look ups in the volume layer 505 and aggregate layer 510 to map an FBN to a PVBN in the physical volume 525. Similar to the example described with reference to FIG. 9, the storage server 210 receives an I/O request including an FBN 705 and uses the FBN as a key in an indirect volume 515 to look up an extent identifier 710 in a volume layer indirect entry 700. The storage server 210 uses the extent identifier 710 as a key to look up a first extent map entry 800 in an extent-to-physical block map 520. In this example, the extent identifier 805 is associated with pointer 810 to a PVBN 905 and a pointer or extent identifier 810 to a second extent map entry 1000 with entries 1005, 1010, 1020, 1025 and 1030. For one embodiment, the first extent has multiple extent map entries 800, one for each pointer or reference 810. For example, each entry 800 would include the same extent identifier 805, but different combinations of pointer 810, offset 815, and length 820. For the sake of simplicity, FIG. 10 illustrates a single extent map entry that includes multiple pointers 810, offsets 815, and lengths 820. The storage server 210 uses the pointer 810 to access PVBN 905 in the physical volume 525. The storage server 210 uses the extent identifier 810 to look up the second extent map entry 1000 in the extent-to-physical block map 520. The storage server 210 uses the pointer 1010 to access PVBN 915 in the physical volume 525.

FIG. 11 shows examples of extent map entries, according to one embodiment. Extent map entry 1100 is for a data container and includes an extent identified by an extent identifier E1. The data container in this example is stored in 24 PVBN blocks starting at block P1 as shown by Pointer 810. P1 is the starting data block within the PVBN space. The FEN offset for the extent is 0 and the extent length is 24. The reference count 825 for E1 is 1, which means that only 1 data container (or any storage object) references the extent identifier, E1. No compression is used in extent map entry 1100 because the compression value is 24, which indicates that the extent E1 has data stored at 24 blocks which is equal to the extent length 24.

Extent map entry 1105 is used when the data container represented by 1100 is compressed. In this example, the 24 blocks of the data container, P1-P24, are compressed into 12 blocks as shown by the compression value of 12. Because the length field 820 is 24 and the compression value is 12, one can infer that the 24 blocks are compressed into 12 physical blocks. The reference count value for entry 1105 is still 1, which means that only one data container references the extent.

Extent map entry 1110 is used when extent E1 of entry 1105 is cloned. In this example, extent map entries 1110 and 1105 use the same extent identifier E1. The clone and the parent extent (E1) in both entries 1105 and 1110 have the same pointer value (P1), offset value I(0), length value (24) and compression value (12). The reference count 825 in the extent map entry 1110 is 2 because the original data container associated with extent map entry 1105 and the cloned version associated with extent map entry 1110 reference the same extent, E1.

In this example, storage operating system 314 uses the compression value 12 to determine how to process compression blocks while cloning E1. Because the entire extent is cloned, storage operating system 314 can use the original compressed blocks "as-is" without having to de-compress them.

Extent map entry 1115 shows an example of a partial clone of a data container, according to one embodiment. As an example, assume that only 14 blocks i.e. blocks P10-P24 of the data container represented by extent identifier E1 in extent map entry 1100 are cloned. A new extent identifier, E2, is generated and stored in extent map entry 1115. For the partial clone, E2 points to extent E1, offset value is 10 for the starting block P10. The length value of 14 indicates that only 14 blocks are cloned. The compression value is 14 indicating that no compression is used. The reference count 825 in this example is 1 because E2 is only referenced by the cloned version that simply points to the source extent identified by E1.

If the partial cloning included any compressed blocks then it is indicated by the compression value 830. Storage operating system 314 handles the compressed blocks based on the location of the compressed blocks within the partial data container that is cloned. For example, in some instances, storage operating system 314 may be able to directly point to the compressed blocks within the partial data container. In other cases, storage operating system 314 may decompress the compressed blocks and then compress them for the partial clone based on efficiency and user preference.

Figure 12:
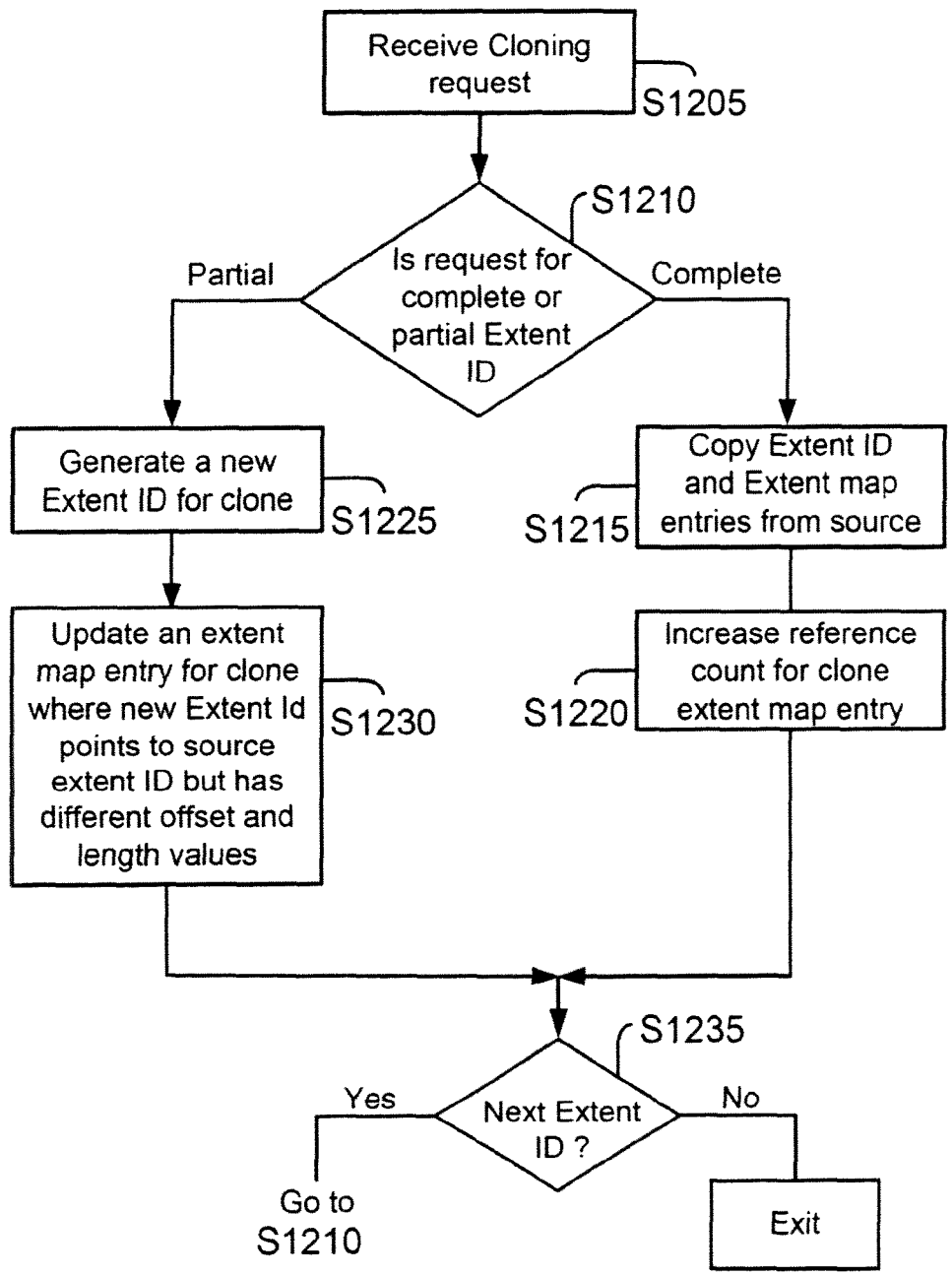
FIG. 12 is an exemplary method of cloning in an extent-based architecture.

FIG. 12 shows a process 1200 for generating a clone, according to one embodiment. The process begins in block S1205 when storage system 210 receives a request for cloning a source data container. The request may be for the entire source data container or a partial source data container. The request may involve one or more extents.

In block S1210, the storage server 210 determines if the cloning request involves a complete source extent with an extent identifier, for example, 1110 as described above. If yes, then in block S1215, the entire source extent is cloned. The extent map entries for the cloned version are the same as the extent map entry for the source data container, except the reference count value that is increased in block 51220. The reference count of the clone is 2 because both the source data container and the clone reference the same extent identifier, for example, E1 in extent map entry 1105 and 1110 of FIG. 11.

In one embodiment, because the entire extent is cloned, storage operating system 314 can use any original compressed blocks "as-is" without having to de-compress them. The number of compressed blocks is indicated by compression value 830 described above in detail.

If the request involves a partial extent, then in block S1225, a new extent identifier is generated by the storage server 210, for example, E2 of extent map entry 1115 described above with respect to FIG. 11. In block S1230, the new extent map entry is updated by storage server 210. The new extent identifier points to the original extent identifier with a different offset value and length. For example, as shown in FIG. 11, the extent map entry 1115 has an offset value of 10, instead of 0 in 1100. The length in extent map entry 1115 is 14 which means that 14 blocks of the source data container identified by 1100 are cloned. The reference count of the cloned version is 1 because only the cloned data container references the new extent identifier, E2.

The compression value 830 is used in block S1230 to process any compressed blocks within the partial extent that is cloned. In some instances, the compressed blocks may be used "as-is" and in other instances, the compressed blocks may be de-compressed and then compressed for the partial clone.

In block S1235, the storage server 210 determines if there is another extent identifier for the cloning request in block S1205. Storage server 210 determines if there is another extent identifier if pointer 810 points to another extent identifier, as shown in FIG. 10 and described above in detail. If there is another extent identifier, the process moves back to block S1210, otherwise, the process ends in block S1240.

The extent based architecture described above has advantages in performing cloning/partial cloning. The storage system does not have to navigate through a complex conversion process involving VVBN, especially where compression and partial cloning is involved. Instead, extent map entries are efficiently used for generating complete and/or partial clones.

Thus, embodiments of an extent-based architecture are implemented in a computer system as described herein. In practice, the methods described above may constitute one or more programs made up of computer-executable instructions. The computer-executable instructions may be written in a computer programming language, e.g., software, or may be embodied in firmware logic or in hardware circuitry. The computer-executable instructions to implement a persistent cache may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that embodiments of this invention be limited only by the following claims and equivalents thereof.

What is claimed is:

1. A machine implemented method, comprising:

generating, by a storage server a new extent identifier for cloning a portion of a source extent identified by a source extent identifier stored at a source data structure;

wherein the source extent includes a group of contiguous blocks for storing a data container and the source data structure includes a length value providing a length of the source extent, an offset value that refers to a distance in blocks from a known location of the data container and a reference count value that provides a number of data containers that reference the source extent identifier; and updating a data structure for a cloned version of the data container for storing the new extent identifier that points to the source extent identifier;

wherein the updated data structure includes an extent length value that is different from the length value of the source data structure and an offset value that is different from the offset value of the source data structure; and wherein when a cloning request is to clone the entire source extent then the source extent identifier is also used for the cloned version and a reference count value of the data structure for the cloned version indicates that the source extent identifier is referenced by both the data container and the cloned version.

2. The method of claim 1, wherein the source data structure and the data structure for the cloned version include a same offset value and a length value.

3. The method of claim 1, wherein the source data structure maps to a physical block number (PVBN) that points to a location where information is stored for the source extent.

4. The method of claim 1, wherein the source data structure includes a compression indicator indicating if the source extent is compressed and provides a number of blocks used for compressing the data container and wherein the compression indicator is used to process compressed blocks for the cloned version of the data container.

5. The method of claim 1, wherein the storage server operates in a cluster based storage environment.

6. The method of claim 1, wherein the storage server operates in a non-cluster based storage environment.

7. A storage server comprising:

a memory; and a processor coupled to the memory through a bus, wherein the processor executes instructions out of the memory that cause the processor to:

generate a new extent identifier for cloning a portion of a source extent identified by a source extent identifier that is stored at a source data structure; wherein the source extent includes a group of contiguous blocks for storing a data container and the source data structure includes a length value providing a length of the source extent, an offset value that refers to a distance in blocks from a known location of the data container and a reference count value that provides a number of data containers that reference the source extent identifier; and update a data structure for a cloned version of the data container for storing the new extent identifier that points to the source extent identifier; wherein the updated data structure includes an extent length value that is different from the length value of the source data structure and an offset value that is different from the offset value of the source data structure; and wherein when a cloning request is to clone the entire source extent then the source extent identifier is used for the cloned version and a reference count value of the data structure for the cloned version indicates that the source extent identifier is referenced by both the data container and the cloned version.

8. The storage server of claim 7, wherein the source data structure and the data structure for the cloned version include a same offset value and a length value.

9. The storage server of claim 7, wherein the source data structure maps to a physical block number (PVBN) that points to a location where information is stored for the source extent.

10. The storage server of claim 7, wherein the source data structure includes a compression indicator indicating if the source extent is compressed and provides a number of blocks used for compressing the data container and wherein the compression indicator is used to process compressed blocks for the cloned version of the data container.

11. A non-transitory, machine readable storage medium storing executable instructions, which when executed by a machine, causes the machine to perform a method, the method comprising:

generating, by a storage server a new extent identifier for cloning a portion of a source extent identified by a source extent identifier stored at a source data structure;

wherein the source extent includes a group of contiguous blocks for storing a data container and the source data structure includes a length value providing a length of the source extent, an offset value that refers to a distance in blocks from a known location of the data container and a reference count value that provides a number of data containers that reference the source extent identifier; and updating a data structure for a cloned version of the data container for storing the new extent identifier that points to the source extent identifier;

wherein the updated data structure includes an extent length value that is different from the length value of the source data structure and an offset value that is different from the offset value of the source data structure; and wherein when a cloning request is to clone the entire source extent then the source extent identifier is also used for the cloned version and a reference count value of the data structure for the cloned version indicates that the source extent identifier is referenced by both the data container and the cloned version.

12. The storage medium of claim 11, wherein the source data structure and the data structure for the cloned version include a same offset value and a length value.

13. The storage medium of claim 11, wherein the source data structure maps to a physical block number (PVBN) that points to a location where information is stored for the source extent.

14. The storage medium of claim 11, wherein the source data structure includes a compression indicator indicating if the source extent is compressed and provides a number of blocks used for compressing the data container and wherein the compression indicator is used to process compressed blocks for the cloned version of the data container.

15. The storage medium of claim 11, wherein the storage server operates in a cluster based storage environment.

16. The storage medium of claim 11, wherein the storage server operates in a non-cluster based storage environment.

* * * * *